(12) United States Patent
Saitou et al.

(10) Patent No.: US 8,936,368 B2
(45) Date of Patent: Jan. 20, 2015

(54) ILLUMINATION OPTICAL SYSTEM AND PROJECTOR USING THE SAME

(75) Inventors: Hiroyuki Saitou, Tokyo (JP); Atsushi Katou, Tokyo (JP); Motoyasu Utsunomiya, Tokyo (JP); Akihiro Osaka, Tokyo (JP); Masateru Matsubara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 497 days.

(21) Appl. No.: 12/734,553

(22) PCT Filed: Jan. 29, 2010

(86) PCT No.: PCT/JP2010/051237
§ 371 (c)(1),
(2), (4) Date: May 7, 2010

(87) PCT Pub. No.: WO2011/092841
PCT Pub. Date: Aug. 4, 2011

(65) Prior Publication Data
US 2012/0062857 A1    Mar. 15, 2012

(51) Int. Cl.
*G03B 21/20*    (2006.01)
*G02B 5/22*    (2006.01)
(Continued)

(52) U.S. Cl.
CPC ............... *G02B 5/22* (2013.01); *G02B 26/008* (2013.01); *G03B 33/08* (2013.01); *G03B 33/12* (2013.01);
(Continued)

(58) Field of Classification Search
CPC .... G03B 21/14; G03B 21/204; G02B 26/008; F21S 10/007
USPC .................................. 353/84, 94, 98
See application file for complete search history.

(56) References Cited

U.S. PATENT DOCUMENTS 6,644,814 B2    11/2003  Ogawa et al.
7,547,114 B2 *   6/2009  Li et al. .......................... 362/231
(Continued)

FOREIGN PATENT DOCUMENTS

CN    201097088 Y    8/2008
CN    101581410 A    11/2009
(Continued)

OTHER PUBLICATIONS

Casio XJ-A140/145 launched Jan. 6, 2010 (www.casio.com/news/content/BD906910-2B13-47A1-9285-A4ABD9107087/ and www.casio-intl.com/asia-mea/en/projector/greenslim/xj_a145_140/).*
(Continued)

*Primary Examiner* — Francis M Legasse, Jr.
*Assistant Examiner* — Bao-Luan Le
(74) *Attorney, Agent, or Firm* — McGinn IP Law Group, PLLC (57) ABSTRACT

This invention realizes an illumination optical system with a small etendue that has a longer lifetime and a high degree of brightness. The invention includes: a laser light source that generates excitation light having a first wavelength; a phosphor wheel including a blue fluorescent light generation region that generates fluorescent light having a second wavelength by means of the excitation light, and a green fluorescent light generation region that generates fluorescent light having a third wavelength by means of the excitation light; an LED light source that generates light having a fourth wavelength; and a dichroic mirror that reflects fluorescent light having the second wavelength and fluorescent light having the third wavelength and allows light having the fourth wavelength to pass therethrough, to thereby emit each of the lights in the same direction.

13 Claims, 6 Drawing Sheets

(51) Int. Cl.
*G02B 26/00* (2006.01)
*G03B 33/08* (2006.01)
*G03B 33/12* (2006.01)
*H04N 9/31* (2006.01)
*G02B 27/09* (2006.01)

(52) U.S. Cl.
CPC .......... *H04N 9/3111* (2013.01); *H04N 9/3161* (2013.01); *H04N 9/3197* (2013.01); *G03B 21/204* (2013.01); *G02B 27/0994* (2013.01)
USPC .......................................................... 353/84

(56) References Cited

U.S. PATENT DOCUMENTS

| | | | | |
|---|---|---|---|---|
| 7,651,243 | B2* | 1/2010 | McGuire et al. | 362/293 |
| 2007/0019408 | A1* | 1/2007 | McGuire et al. | 362/231 |
| 2009/0034284 | A1* | 2/2009 | Li et al. | 362/554 |
| 2009/0135377 | A1* | 5/2009 | Yoon et al. | 353/31 |
| 2009/0284148 | A1* | 11/2009 | Iwanaga | 313/506 |
| 2010/0079730 | A1* | 4/2010 | Shibasaki | 353/31 |
| 2010/0238412 | A1* | 9/2010 | Kurosaki | 353/31 |
| 2010/0245776 | A1* | 9/2010 | Yamamoto | 353/38 |
| 2010/0245777 | A1* | 9/2010 | Ogura | 353/38 |
| 2010/0328617 | A1* | 12/2010 | Masuda | 353/31 |
| 2010/0328625 | A1* | 12/2010 | Miyazaki et al. | 353/85 |
| 2010/0328626 | A1* | 12/2010 | Miyazaki | 353/85 |
| 2010/0328627 | A1* | 12/2010 | Miyazaki | 353/85 |
| 2010/0328628 | A1* | 12/2010 | Masuda | 353/85 |
| 2010/0328632 | A1* | 12/2010 | Kurosaki et al. | 353/98 |
| 2010/0328633 | A1* | 12/2010 | Sato et al. | 353/99 |
| 2011/0043764 | A1* | 2/2011 | Narikawa | 353/31 |
| 2011/0043765 | A1* | 2/2011 | Shibasaki | 353/31 |
| 2011/0051102 | A1* | 3/2011 | Ogura et al. | 353/85 |
| 2011/0063581 | A1* | 3/2011 | Iwanaga | 353/31 |
| 2011/0075103 | A1* | 3/2011 | Ogawa et al. | 353/31 |
| 2011/0075106 | A1* | 3/2011 | Shibasaki | 353/31 |
| 2011/0128507 | A1* | 6/2011 | Suzuki et al. | 353/31 |
| 2011/0187998 | A1* | 8/2011 | Kimura et al. | 353/20 |
| 2011/0205502 | A1* | 8/2011 | Kato et al. | 353/84 |
| 2011/0228232 | A1* | 9/2011 | Sakata et al. | 353/31 |
| 2011/0242495 | A1* | 10/2011 | Chen et al. | 353/31 |
| 2011/0249242 | A1* | 10/2011 | Saitou et al. | 353/98 |
| 2011/0261326 | A1* | 10/2011 | Wang et al. | 353/31 |
| 2011/0304830 | A1* | 12/2011 | Kato et al. | 353/84 |
| 2011/0310353 | A1* | 12/2011 | Maeda | 353/31 |
| 2012/0033185 | A1* | 2/2012 | Chang | 353/33 |
| 2012/0044465 | A1* | 2/2012 | Murai et al. | 353/85 |
| 2012/0050693 | A1* | 3/2012 | Yanai | 353/31 |

FOREIGN PATENT DOCUMENTS

| | | |
|---|---|---|
| JP | 2003-186110 | 7/2003 |
| JP | 2004-341105 | 12/2004 |
| JP | 2008-52070 | 3/2008 |
| JP | 2008-286823 | 11/2008 |
| JP | 2009-266463 | 11/2009 |

OTHER PUBLICATIONS

Casio XJ-A145/140; dated Jan. 6, 2010.*
International Search Report (ISR) (PCT Form PCT/ISA/210) dated Mar. 2, 2010.
Chinese Office Action dated Apr. 28, 2014 with an English translation.

* cited by examiner

ILLUMINATION OPTICAL SYSTEM AND PROJECTOR USING THE SAME

TECHNICAL FIELD

The present invention relates to an illumination optical system that generates illumination lights of a plurality of colors for forming image lights of a plurality of colors, and a projector that projects the image lights produced by the illumination optical system.

BACKGROUND ART

Technology that uses an LED (Light Emitting Diode) as a light source of a projector that projects an image onto a screen such as a liquid crystal projector or a DMD (Digital Micromirror Device) projector has been receiving attention (see Patent Literature 1).

Because an LED has a long lifetime and offers high reliability, projectors that employ an LED as a light source have the advantages of long lifetime and high reliability.

However, because the brightness of the light of an LED is low for use as a projector, it is not easy to obtain a projected image that has sufficient brightness with a projector employing an LED as a light source. The extent to which a display panel can utilize light from a light source as projection light is limited by the etendue. More specifically, unless the value of the product of a light-emission area of a light source and the angle of radiation is made less than or equal to the value of the product of the area of the plane of incidence of the display panel and the capturing angle that is determined by an f-number of the illumination optical system, the light from the light source can not be effectively utilized as projection light.

Although the light quantity of a light source that employs an LED can be increased by increasing the light-emission area, if the light-emission area increases, the etendue of the light source will also increase. As a light source for a projector, it is desirable in terms of the limitation produced by the etendue to increase the light quantity without increasing the light-emission area. However, it is difficult for a light source that employs an LED to increase the light quantity without increasing the light-emission area.

CITATION LIST

Patent Literature

Patent Literature 1: JP2003-186110A

SUMMARY OF INVENTION

Technical Problem

The etendue of a light source that using only a LED is increases. The present invention realizes an illumination optical system with a small etendue, a longer lifetime, and a high level of brightness.

Solution to Problem

An illumination optical system of the present invention comprises:
a laser light source that generates an excitation light having a first wavelength;
a phosphor wheel that includes a blue fluorescent light generation region that generates fluorescent light having a second wavelength by means of the excitation light, and a green fluorescent light generation region that generates fluorescent light having a third wavelength by means of the excitation light;
an LED light source that generates light having a fourth wavelength; and
a dichroic mirror that reflects fluorescent light having the second wavelength and fluorescent light having the third wavelength, and allows light having the fourth wavelength to pass therethrough to thereby emit each of the lights in the same direction.

Further, a projector according to the present invention comprises the above described illumination optical system.

Advantageous Effects of Invention

According to the present invention, since a laser with a high energy density converges on a phosphor as excitation light, and since fluorescent light is emitted from the place at which the laser converges is used, an illumination optical system can be realized that has a small etendue, a longer lifetime and a higher level of brightness.

DESCRIPTION OF EMBODIMENTS

Next, exemplary embodiments are described with reference to the drawings.

Figure 1:
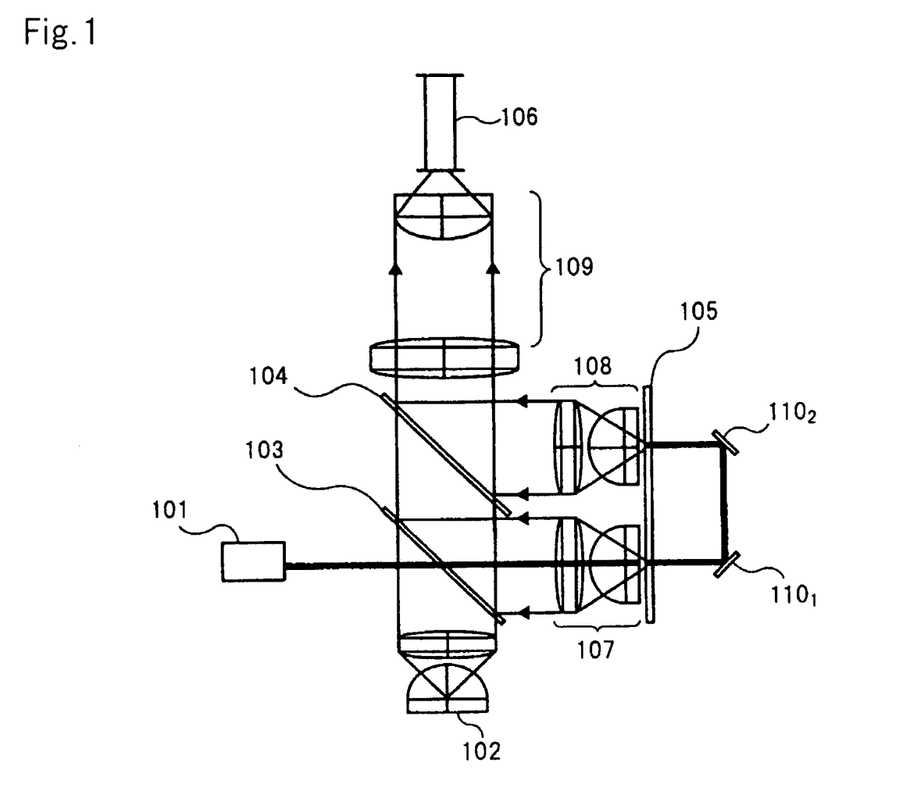
FIG. 1 is a block diagram that illustrates the configuration of an exemplary embodiment of an illumination optical system according to the present invention.

FIG. 1 is a block diagram that illustrates the configuration of one exemplary embodiment of an illumination optical system according to the present invention.

The present exemplary embodiment includes laser light source 101, LED light source 102, dichroic mirrors 103 and 104, phosphor wheel 105, light tunnel 106, lens groups 107 to 109, and reflection mirrors $110_1$ and $110_2$.

Figure 2:
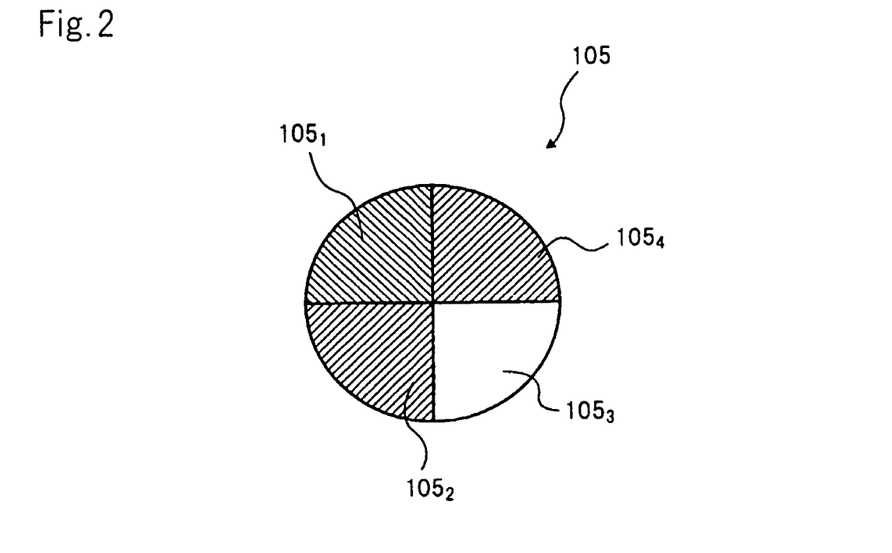
FIG. 2 is a plan view of phosphor wheel 105 as viewed from laser light source 101 side (from the left side towards the right side in FIG. 1).

FIG. 2 is a plan view of phosphor wheel 105 as viewed from the left side towards the right side of FIG. 1.

Laser light source 101 generates an excitation laser light of wavelength $\lambda 1$. Phosphor wheel 105 includes blue phosphor region $105_1$ and green phosphor regions $105_2$ and $105_4$ that generate blue fluorescent light and green fluorescent light, respectively, of wavelengths $\lambda 2$ and $\lambda 3$ ($\lambda 2 < \lambda 3$) that are longer than wavelength $\lambda 1$ when an excitation laser light is incident thereon. Phosphor wheel 105 also includes transparent region $105_3$ that allows light to pass through.

First, the properties of each optical element of the present exemplary embodiment are described.

LED light source 102 generates red light having wavelength $\lambda 4$ that is longer than wavelength $\lambda 3$. Thus, according to the present exemplary embodiment, lights having four wavelengths, $\lambda 1$ to $\lambda 4$, are used, and the relationship between the wavelengths is $\lambda 1 < \lambda 2 < \lambda 3 < \lambda 4$. The reflecting surfaces of dichroic mirrors 103 and 104 are parallelly arranged. Dichroic mirror 103 reflects only light of $\lambda 3$, and allows light of $\lambda 1$, $\lambda 2$ and $\lambda 4$ to pass. Dichroic mirror 104 reflects only light of $\lambda 2$, and allows light of $\lambda 1$, $\lambda 3$ and $\lambda 4$ to pass. In this connection, dichroic mirror 104 may also be provided so as to reflect light of $\lambda 1$ and $\lambda 2$, and to allow light of $\lambda 3$ and $\lambda 4$ to pass.

Figure 3:
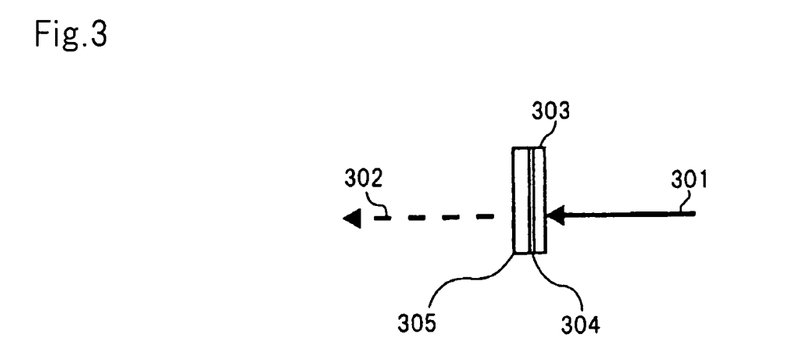
FIG. 3 is a sectional view illustrating the structure of blue phosphor region $105_1$ in FIG. 2.
Figure 4:
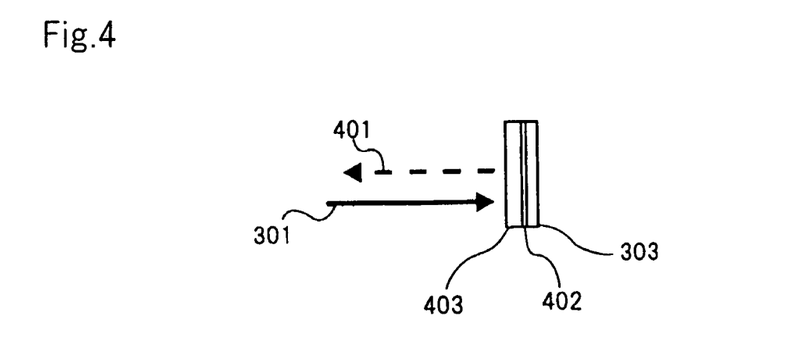
FIG. 4 is a sectional view illustrating the structure of green phosphor regions $105_2$ and $105_4$ in FIG. 2.

FIG. 3 and FIG. 4 are sectional views that illustrate the structure of blue phosphor region $105_1$ and green phosphor regions $105_2$ and $105_4$.

As shown in FIG. 3, in blue phosphor region $105_1$, reflective layer 304 and blue phosphor layer 305 are formed on substrate 303 that is transparent with respect to wavelengths $\lambda 1$ to $\lambda 4$. When excitation laser light having wavelength $\lambda 1$ is incident on blue phosphor layer 305, blue phosphor layer 305 generates blue fluorescent light having wavelength $\lambda 2$. Reflective layer 304 allows the excitation laser light having wavelength $\lambda 1$ to pass therethrough, and reflects blue fluorescent light having wavelength $\lambda 2$ generated at blue phosphor layer 305. Therefore, as shown in FIG. 3, when excitation laser light 301 having wavelength $\lambda 1$ is incident from the side of substrate 303, blue fluorescent light 302 having wavelength $\lambda 2$ is emitted from blue phosphor layer 305 side.

As shown in FIG. 4, in green phosphor regions $105_2$ and $105_4$, reflective layer 402 and green phosphor layer 403 are formed on substrate 303 that is transparent with respect to wavelengths $\lambda 1$ to $\lambda 4$. When excitation laser light 301 having wavelength $\lambda 1$ is incident on green phosphor layer 403, green phosphor layer 403 generates green fluorescent light having wavelength $\lambda 3$. Reflective layer 402 reflects green fluorescent light having wavelength $\lambda 3$ generated at green phosphor layer 403. Therefore, as shown in FIG. 4, when excitation laser light 301 having wavelength $\lambda 1$ is incident from the side of green phosphor layer 403, green fluorescent light 403 having wavelength $\lambda 3$ is generated at green phosphor layer 305, and the thus generated light is reflected by reflective layer 402 and emitted from the side of green phosphor layer 305.

Next, the arrangement of an optical system according to the present exemplary embodiment is described.

When a case is assumed in which there is no phosphor wheel 105, each member is arranged so that outgoing light of laser light source 1 passes through dichroic mirror 103 and lens group 109, is returned by reflection mirrors $110_1$ and $110_2$, and is incident on dichroic mirror 103 through lens group 108. The optical axes of lens group 107 and lens group 108 and the rotational axis of phosphor wheel 105 are parallel, and the center of rotation of phosphor wheel 105 is midway between the optical axes of lens group 107 and lens group 108.

The optical axis of laser light source 101 is perpendicular to the optical axis of LED light source 102. The outgoing light of laser light source 101 is incident on phosphor wheel 105 via dichroic mirror 103 and lens group 109. As described above, phosphor wheel 105 includes three kinds of regions, and the action after light is incident on phosphor wheel 105 differs depending on the region that light is incident on.

As shown in FIG. 2, circular phosphor wheel 105 is divided into four regions, of which blue phosphor region $105_1$ and transparent region $105_3$, and green phosphor region $105_2$ and green phosphor region $105_4$ are arranged so as to be symmetrical about a point.

Outgoing light of laser light source 101 is incident on phosphor wheel 105 via dichroic mirror 103 and lens group 107. The point of incidence thereof (hereunder, referred to as "primary focal point") is in any one of the above described three kinds of regions. When the primary focal point is in transparent region $105_3$, incident light passes through transparent region $105_3$, is returned by reflection mirrors $110_1$ and $110_2$, and is incident at a secondary focal point in blue phosphor region $105_1$ at a position that is symmetrical about a point with respect to the primary focal point of phosphor wheel 105.

Hereunder, the action after light is incident is described with respect to cases where the primary focal point is green phosphor region $105_2$ and green phosphor region $105_4$, transparent region $105_3$, and blue phosphor region $105_1$, respectively.

When the primary focal point is in green phosphor region $105_2$ and green phosphor region $105_4$, the configuration is as shown in FIG. 4. Green fluorescent light having wavelength $\lambda 3$ that is generated at green phosphor layer 403 is diffused light, and is collimated by lens group 107. Thereafter, the green fluorescent light is reflected towards light tunnel 106 by dichroic mirror 103. Subsequently, the green fluorescent light passes through dichroic mirror 104, is condensed by lens group 109, and is incident on light tunnel 106.

When the primary focal point is transparent region $105_3$, outgoing light of laser light source 101 is incident at the secondary focal point in blue phosphor region $105_1$ from the rear surface of phosphor wheel 105 (from the left side of the figure towards the right side in FIG. 1), and a configuration is entered as shown in FIG. 3. Blue fluorescent light having wavelength $\lambda 2$ generated at blue phosphor layer 305 is diffused light, and is collimated by lens group 108. Thereafter, the blue fluorescent light is reflected towards light tunnel 106 by dichroic mirror 104, is condensed by lens group 109, and is incident on light tunnel 106.

When the primary focal point is blue phosphor region $105_1$, blue fluorescent light having wavelength $\lambda 2$ generated at blue phosphor layer 305 is collimated by lens group 107, passes through dichroic mirror 103, and is returned to laser light source 101. Thus, blue fluorescent light generated when the primary focal point is in blue phosphor region $105_1$ is not utilized as illumination light. According to the present exemplary embodiment, when the primary focal point is in blue phosphor region $105_1$, laser light source 101 is extinguished, LED light source 102 is lit, and red outgoing light having wavelength $\lambda 4$ of LED light source 102 is incident on light tunnel 106 through dichroic mirrors 103 and 104 and lens group 109.

As described above, according to an illumination optical system of the present exemplary embodiment, when the primary focal point is in green phosphor region $105_2$ and green phosphor region $105_4$, green fluorescent light is incident on light tunnel 106. When the primary focal point is in transparent region $105_3$, blue fluorescent light is incident on light tunnel 106. When the primary focal point is in blue phosphor region $105_1$, red light of LED light source 102 is incident on light tunnel 106. The illumination distribution of each of these incident lights inside light tunnel 106 is uniformized, so that uniformized red light, green light, blue light, and green light appear in that order on the outgoing light side of light tunnel 106 to be used as illumination light. In this connection, yellow or magenta may be used as illumination light by using a yellow phosphor or a magenta phosphor instead of one of the green phosphors.

Figure 5:
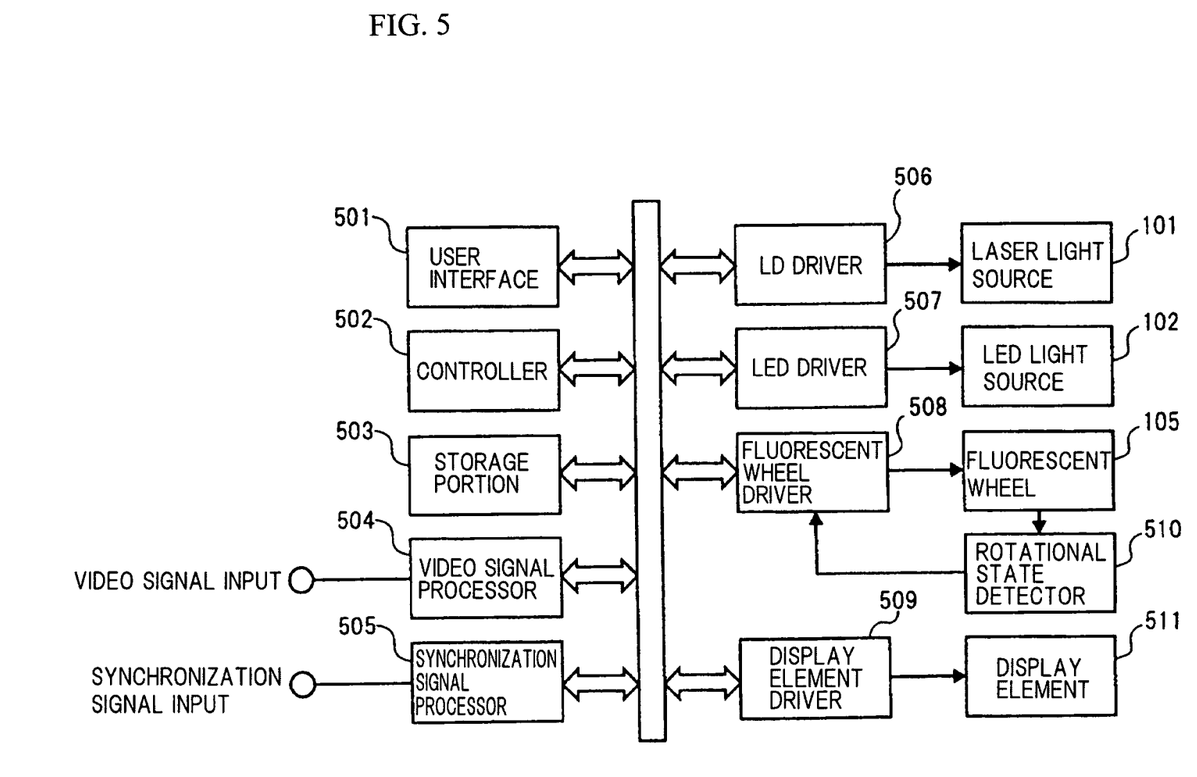
FIG. 5 is a block diagram illustrating the circuit configuration of a projector that uses an illumination optical system according to the present invention.

FIG. 5 is a block diagram that illustrates a circuit configuration of a projector that uses an illumination optical system of the present exemplary embodiment.

A projector illustrated in FIG. 5 includes user interface 501, controller 502, storage portion 503, video signal processor 504, synchronization signal processor 505, LD driver 506, LED driver 507, phosphor wheel driver 508, display element driver 509, rotational state detector 510, and display element 511, as well as laser light source 101, LED light source 102, and phosphor wheel 105 shown in FIG. 1.

User interface 501 accepts instructions input from a user, and outputs the instructions to controller 502. User interface 501 also displays the current operating state of the projector on a display apparatus (not shown) such as an indicator or a display panel.

Controller 502 controls each component comprising the projector in accordance with a program stored in storage portion 503.

Storage portion 503 stores a control program of controller 503, or temporarily stores video data.

Video signal processor 504 converts a video signal input from outside into a video signal to be used inside the projector. Since video signals of the present exemplary embodiment are formed by illumination lights of respective colors being output sequentially by an illumination optical system as described above, video signals according to each color are generated sequentially.

Synchronization signal processor 505 converts synchronization signals that are synchronized with video signals input from outside into video signals to be used inside the projector. More specifically, synchronization signal processor 505 generates and outputs synchronization signals that show the output timing of video signals of each color.

LD driver 506 controls the lighting state of laser light source 101 according to synchronization signals output from synchronization signal processor 505. LED driver 507 controls the lighting state of LED light source 102 according to synchronization signals output from synchronization signal processor 505.

Rotational state detector 510 detects the rotational state of phosphor wheel 105, and outputs the detected result to phosphor wheel driver 508.

Phosphor wheel driver 508 controls the rotational state of phosphor wheel 105 so that the color of a video signal indicated by a synchronization signal output by synchronization signal processor 505 and a color output by the illumination optical system that indicates the rotational state of phosphor wheel 105 detected by rotational state detector 510 match.

Display element driver 509 drives display element 511 in accordance with video signals output by the video signal processor. In this case, a reflective image forming element in which a plurality of micromirrors are arranged in a matrix and which forms an image according to the reflection state of each micromirror, or a transmission-type liquid crystal display element or reflective liquid crystal display element is used as a display element.

shuusei

According to the projector configured as described above, display element 511 that displays images corresponding to each color by means of illumination light of each color sequentially output from the illumination optical system is illuminated, and reflection images or transmission images of display element 511 are sequentially projected through a projection optical system (not shown).

Next, another exemplary embodiment is described.

Figure 6:
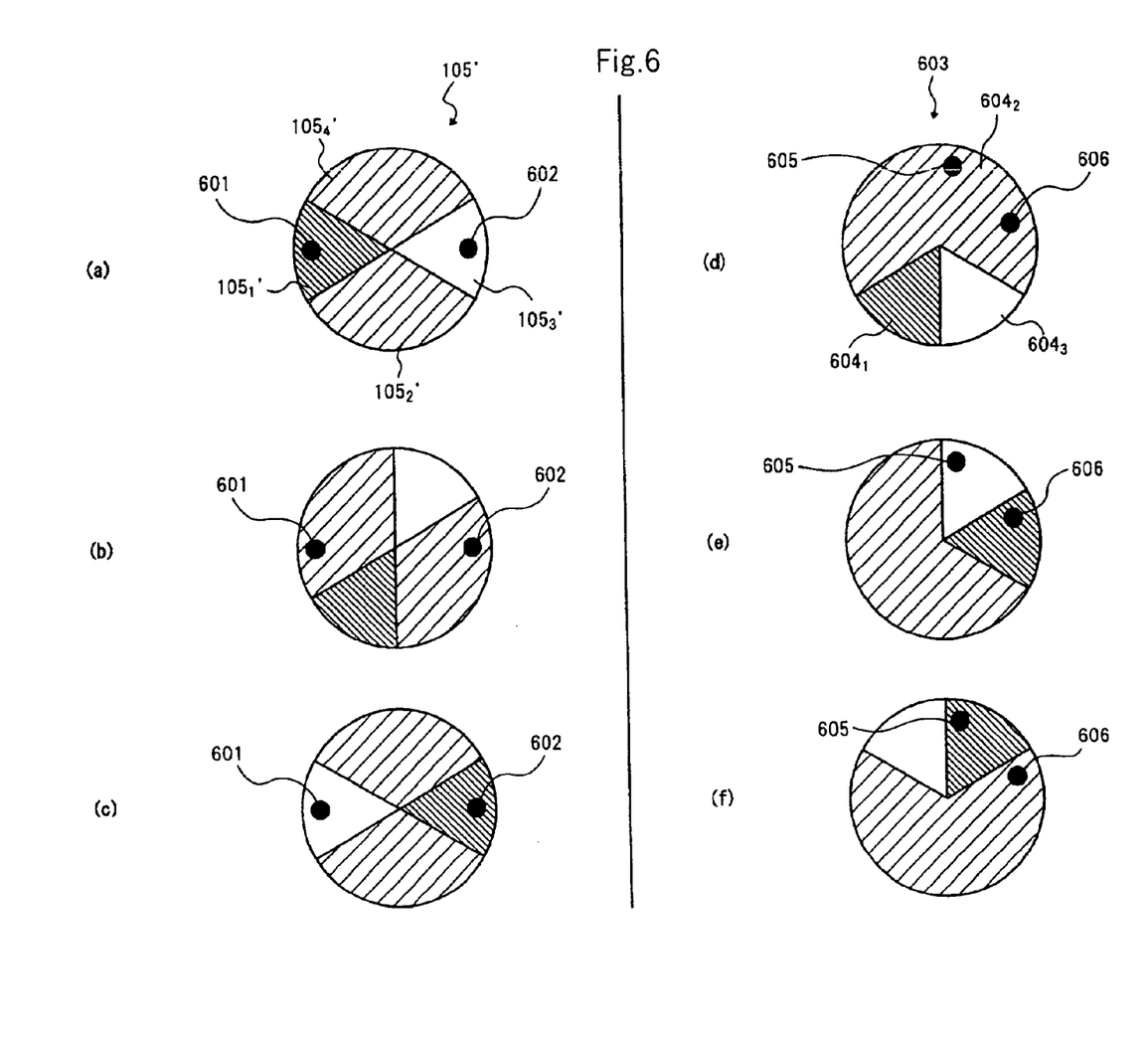
FIGS. 6(a) to (c) are plan views that illustrate the structure of principal parts of a second exemplary embodiment of the illumination optical system according to the present invention.
FIGS. 6(d) to (f) are plan views that illustrate the structure of principal parts of a third exemplary embodiment of the illumination optical system according to the present invention.

FIGS. 6(a) to (c) are plan views that illustrate the structure of principal parts of a second exemplary embodiment of the illumination optical system according to the present invention. FIGS. 6(d) to (f) are plan views that illustrate the structure of principal parts of a third exemplary embodiment of the illumination optical system according to the present invention.

Phosphor wheel 105 shown in FIG. 2 is equally divided into four regions in which blue phosphor region $105_1$ and transparent region $105_3$, and green phosphor region $105_2$ and green phosphor region $105_4$ are arranged so as to be symmetrical about a point. In contrast, in phosphor wheel 105' shown in FIG. 5(a) to (c), the areas of blue phosphor region $105_1$' and transparent region $105_3$' are different from the areas of green phosphor region $105_2$' and green phosphor region $105_4$'. Since the remaining configuration is the same as in the exemplary embodiment illustrated in FIG. 1, a description thereof is omitted here.

The areas of green phosphor region $105_2$' and green phosphor region $105_4$' are made to be twice the areas of blue phosphor region $105_1$' and transparent region $105_3$'. Since phosphor wheel 105 illustrated in FIG. 2 is divided into equal regions, when phosphor wheel 105 is rotated once, red light, green light, blue light, and green light appear for the same period. In contrast, according to the present exemplary embodiment, each time period for which green light appears is twice the time period for which red light and blue light appear.

Figure 7:
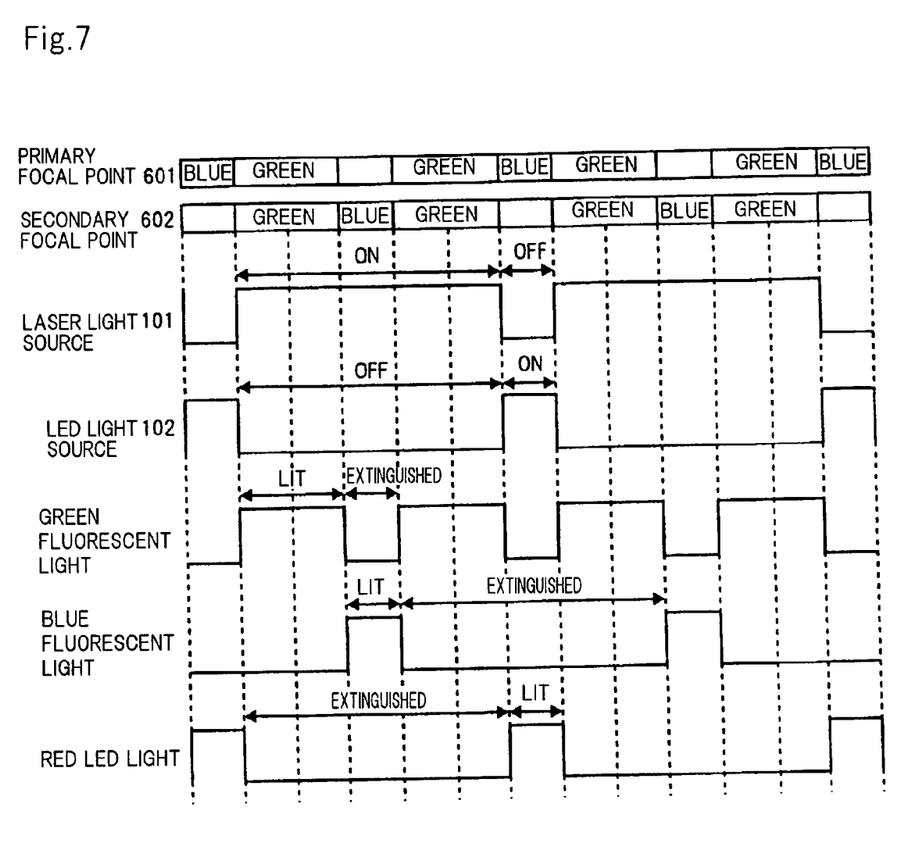
FIG. 7 is a timing chart that illustrates light emission times of a second exemplary embodiment.

FIG. 7 is a timing chart that shows light emission times of a second exemplary embodiment.

As shown in FIG. 6(a), when primary focal point 601 is on blue phosphor region $105_1$', laser light source 101 is placed in an extinguished state, and LED light source 102 is lit so that red LED light appears (lighting time is taken as period T).

As shown in FIG. 6(b), when primary focal point 601 is on green phosphor region $105_4$', green fluorescent light appears (period 2T).

As shown in FIG. 6(c), when primary focal point 601 is on transparent region $105_3$', blue fluorescent light appears that is generated at secondary focal point 602 (period T).

Thereafter, when primary focal point 601 is on green phosphor region $105_2$', green fluorescent light appears (period 2T).

Although the generated proportions of each color light, when the phosphor wheel is rotated once, are the same in the exemplary embodiment shown in FIG. 6(d) to (f) as in the exemplary embodiment shown in FIG. 6(a) to (c), the phosphor wheel in the exemplary embodiment shown in FIG. 6(d) to (f) is arranged so that green fluorescent light appears consecutively.

According to the present exemplary embodiment, the rotational axis of phosphor wheel 603 is placed in a different position to that of phosphor wheel 105 shown in FIG. 1 and phosphor wheel 105' shown in FIG. 6(a) to (c), and the size thereof is also changed. Since the remaining configuration is the same as in the exemplary embodiment illustrated in FIG. 1, a description thereof is omitted here.

In phosphor wheel 603, blue phosphor region $604_1$ and transparent region $604_3$ of equal area and green fluorescent light region $604_2$ of an area four times the size of the area of blue phosphor region $604_1$ and transparent region $604_3$ are formed in an arc shape. As described above, since the axis of the center of rotation of phosphor wheel 603 is midway between the optical axes of lens group 107 and lens group 108, according to the present exemplary embodiment, the relation between primary focal point 605 and secondary focal point 606 is not one in which primary focal point 605 and secondary focal point 606 are point symmetric with regard to phosphor wheel 603. In the present exemplary embodiment, as shown in FIGS. 6(d) to (f) primary focal point 605 and secondary focal point 606 have a positional relationship that maintains a predetermined interval that matches the interval of blue phosphor region $604_1$ or transparent region $604_3$.

Figure 8:
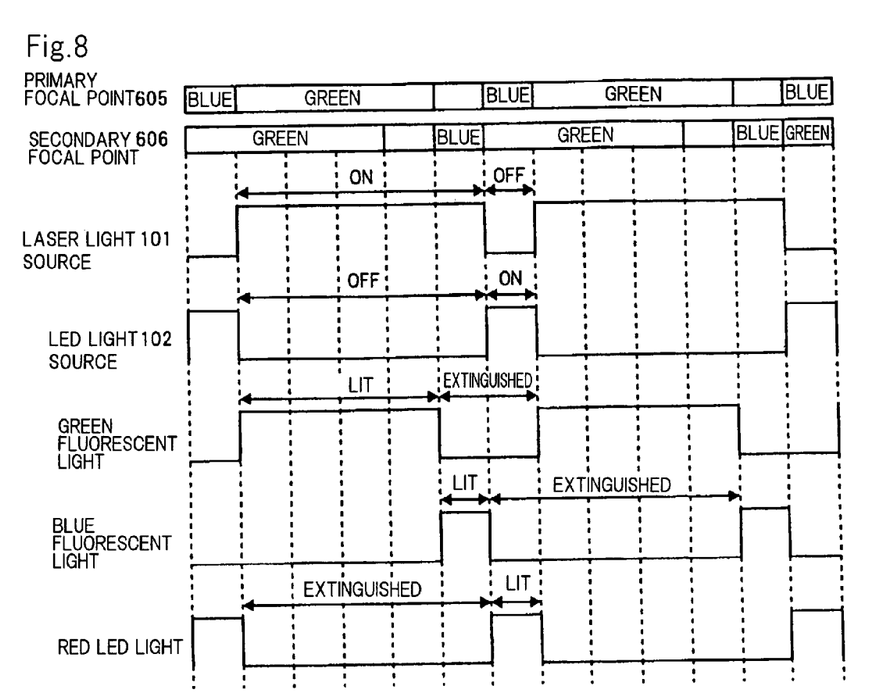
FIG. 8 is a timing chart that illustrates light emission times of a third exemplary embodiment.

FIG. 8 is a timing chart that shows light emission times of the second exemplary embodiment.

As shown in FIG. 6(f), when primary focal point 605 is on blue phosphor region $604_1'$, laser light source 101 is placed in an extinguished state and LED light source 102 is lit so that red LED light appears (lighting time taken as period T).

As shown in FIG. 6(d), when primary focal point 605 is on green phosphor region $604_2'$, green fluorescent light appears (period 4T).

As shown in FIG. 6(e), when primary focal point 605 is on transparent region $105_3'$, blue fluorescent light appears that is generated at secondary focal point 606 (period T).

Figure 9:
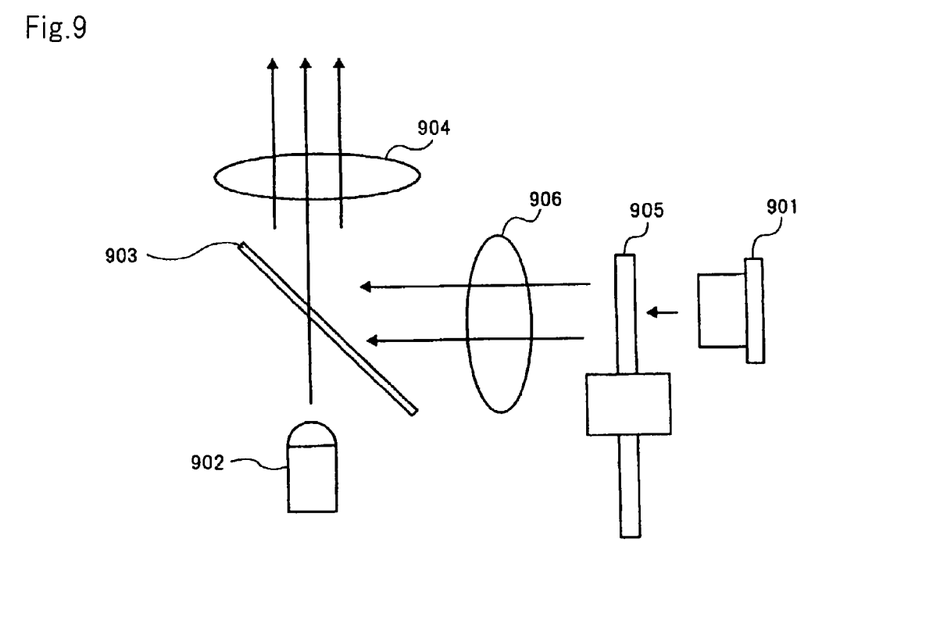
FIG. 9 is a block diagram that illustrates the structure of principal parts of a fourth exemplary embodiment of the illumination optical system according to the present invention.

FIG. 9 is a block diagram that illustrates the structure of principal parts of a fourth exemplary embodiment of the illumination optical system according to the present invention.

The present exemplary embodiment includes laser light source 901, LED light source 902, dichroic mirror 903, lens groups 904 and 906, and phosphor wheel 905.

Laser light source 901 generates excitation laser light having wavelength □1.

LED light source 902 generates red light having wavelength □4 that is longer than wavelength □3.

Dichroic mirror 903 allows light having wavelength □4 to pass therethrough, and reflects light of wavelengths □1 to □3.

Similarly to phosphor wheel 105 shown in FIG. 1, phosphor wheel 905 includes a blue phosphor region and a green phosphor region that generate blue fluorescent light and green fluorescent light, respectively, having wavelengths □2 and □3 (□2<□3) that are longer than wavelength □1 when an excitation laser light is incident thereon. Phosphor wheel 905 also includes a transparent region.

When laser light from laser light source 901 is emitted towards phosphor wheel 905, blue fluorescent light is generated when the incidence position of the laser light is in the blue phosphor region. The blue fluorescent light is collimated by lens group 906, reflected by dichroic mirror 903, and emitted as illumination light through lens group 904.

When the incidence position of the laser light is in a green phosphor region, green fluorescent light is generated. The green fluorescent light is collimated by lens group 906, reflected by dichroic mirror 903, and emitted as illumination light through lens group 904.

When the incidence position of laser light is in the transparent region, the laser light passes through phosphor wheel 905 without generating fluorescent light, and is reflected by dichroic mirror 903 and emitted. Thus, illumination light is not generated when the incidence position of laser light is in a transparent region. According to the present exemplary embodiment, when the primary focal point is in the transparent region, laser light source 901 is extinguished, LED light source 902 is lit, and red outgoing light having wavelength □4 of LED light source 902 is emitted as illumination light through dichroic mirror 903 and lens group 904.

As described above, in both the second and third exemplary embodiments, red light, green light, blue light, and green light, that are used as illumination light, appear in sequence, and by driving display element 511 by means of the arrangement illustrated in FIG. 5, a projector with a high level of brightness and a long lifetime can be realized.

REFERENCE SIGNS LIST

101 Laser light source
102 LED light source
103, 104 Dichroic mirror
105 Phosphor wheel
106 Light tunnel
107 to 109 Lens group
$110_1$, $110_2$ Reflection mirror

The invention claimed is:

1. An illumination optical system, comprising:
   a laser light source that generates an excitation light having a first wavelength;
   a phosphor wheel comprising a blue fluorescent light generation region that generates fluorescent light having a second wavelength by the excitation light, and a green fluorescent light generation region that generates fluorescent light having a third wavelength by the excitation light;
   an LED (Light Emitting Diode) light source that generates light having a fourth wavelength; and
   a dichroic mirror that reflects fluorescent light having the second wavelength and fluorescent light having the third wavelength, and allows light having the fourth wavelength to pass therethrough to thereby emit each of the lights in a same direction,
   wherein a reflective layer that allows the excitation light to pass therethrough and reflects fluorescent light having the second wavelength and fluorescent light having the third wavelength is formed in the phosphor wheel,
   wherein in the blue fluorescent light generation region, a blue phosphor that generates fluorescent light having the second wavelength by the excitation light is formed on the reflective layer, and
   wherein in the green fluorescent light generation region, a green phosphor that generates fluorescent light having the third wavelength by the excitation light is formed on the reflective layer,
   wherein the phosphor wheel includes a transparent region that allows light of all wavelengths to pass therethrough,
   wherein the illumination optical system comprises a recursive mechanism that causes light that has passed through the transparent region to be incident on the phosphor wheel again, and
   wherein the dichroic mirror comprises:
      a first dichroic mirror that reflects fluorescent light having the third wavelength that is generated when the excitation light from the green phosphor side is incident on the green fluorescent light generation region; and
      a second dichroic mirror that reflects fluorescent light having the second wavelength that is generated when the excitation light that passes through the transparent region is incident from the side of reflective layer on the blue fluorescent light generation region by means of the recursive mechanism.

2. A projector comprising an illumination optical system according to claim 1.

3. The illumination optical system according to claim 1, wherein reflecting surfaces of the first dichroic mirror and the second dichroic mirror are arranged in parallel.

4. The illumination optical system according to claim 1, further comprising an optical device which collimates the fluorescent light having the third wavelength.

5. The illumination optical system according to claim 4, wherein the optical device comprises a lens.

6. An illumination method for a display device, said method comprising:
   generating an excitation light having a first wavelength;
   generating, by a phosphor wheel comprising a blue fluorescent light generation region, fluorescent light having a second wavelength by the excitation light;
   generating, by the phosphor wheel that further comprises a green fluorescent light generation region, fluorescent light having a third wavelength by the excitation light;
   generating, by an LED (Light Emitting Diode) light source, light having a fourth wavelength; and
   reflecting fluorescent light having the second wavelength and fluorescent light having the third wavelength, and allowing light having the fourth wavelength to pass therethrough to thereby emit each of the lights in a same direction,
   wherein a reflective layer that allows the excitation light to pass therethrough and reflects fluorescent light having the second wavelength and fluorescent light having the third wavelength is formed in the phosphor wheel,
   wherein in the blue fluorescent light generation region, a blue phosphor that generates fluorescent light having the second wavelength by the excitation light is formed on the reflective layer, and
   wherein in the green fluorescent light generation region, a green phosphor that generates fluorescent light having the third wavelength by the excitation light is formed on the reflective layer,
   wherein the phosphor wheel includes a transparent region that allows light of all wavelengths to pass therethrough,
   wherein a recursive mechanism causes light that has passed through the transparent region to be incident on the phosphor wheel again, and
   wherein the reflecting fluorescent light comprises:
      reflecting fluorescent light having the third wavelength that is generated when the excitation light from the green phosphor side is incident on the green fluorescent light generation region; and
      reflecting fluorescent light having the second wavelength that is generated when the excitation light that passes through the transparent region is incident from the side of reflective layer on the blue fluorescent light generation region by the recursive mechanism.

7. The method according to claim 6, wherein a dichroic mirror performs said reflecting fluorescent light having the second wavelength and fluorescent light having the third wavelength.

8. The method according to claim 7, wherein the dichroic mirror comprises a first dichroic mirror that performs said reflecting fluorescent light having the third wavelength.

9. The method according to claim 8, wherein the dichroic mirror further comprises a second dichroic mirror that performs said reflecting fluorescent light having the second wavelength.

10. The method according to claim 9, wherein reflecting surfaces of the first dichroic mirror and the second dichroic mirror are arranged in parallel.

11. The method according to claim 6, further comprising collimating the fluorescent light having the third wavelength.

12. The method according to claim 11, wherein an optical device performs said collimating the fluorescent light having the third wavelength.

13. The method according to claim 12, wherein the optical device comprises a lens.

* * * * *